United States Patent
Sato et al.

(10) Patent No.: US 6,491,848 B1
(45) Date of Patent: Dec. 10, 2002

(54) METHOD OF PRETREATING ACTIVATED CARBON FOR POLARIZED ELECTRODE

(75) Inventors: Kenji Sato, Wako (JP); Hiroto Kobayashi, Wako (JP); Takashi Higono, Wako (JP); Yasuhiro Matsumoto, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 123 days.

(21) Appl. No.: 09/668,378

(22) Filed: Sep. 25, 2000

(30) Foreign Application Priority Data

Sep. 24, 1999 (JP) .......................................... 11-270029
Aug. 21, 2000 (JP) ....................................... 2000-250168

(51) Int. Cl.$^7$ ................................................. H01B 1/04
(52) U.S. Cl. ........................ 252/510; 423/460; 429/209
(58) Field of Search ................................ 252/502, 510; 423/460; 429/209, 232; 502/416

(56) References Cited

U.S. PATENT DOCUMENTS 4,978,650 A * 12/1990 Coughlin et al. ........... 502/432
5,837,644 A * 11/1998 Nakanishi et al. .......... 502/416
5,948,329 A *  9/1999 Ohsaki et al. ............. 264/29.4

* cited by examiner

Primary Examiner—Mark Kopec
(74) Attorney, Agent, or Firm—Arent Fox Kintner Plotkin & Kahn

(57) ABSTRACT

An activated carbon for use as a polarized electrode is brought into contact with an organic compound which forms an azeotropic mixture with water, so that the activated carbon is impregnated with the organic compound. Then, the activated carbon impregnated with the organic compound is dried with heat to remove the azeotropic mixture of the organic compound and the water. The activated carbon is immersed in the organic compound to impregnate the activated carbon with the organic compound. Preferably, when the organic compound forms an azeotropic mixture with water, the azeotropic mixture contains 28 weight % of water or more. The organic compound preferably comprises at least one compound selected from the group consisting of benzene, chlorobenzene, ethyl acetate, methyl ethyl ketone, 1,4-dioxane, and methyl acetate, and more preferably comprises benzene.

6 Claims, 7 Drawing Sheets

METHOD OF PRETREATING ACTIVATED CARBON FOR POLARIZED ELECTRODE

BACKGROUND OF THE INVENTION

1. Field of the Invention

The present invention relates to a method of pretreating an activated carbon for use as a polarized electrode in an electrochemical capacitor such as an electric double-layer capacitor, a pseudo-capacitor, or the like.

2. Description of the Related Art

Materials having large specific surface areas are suitable for use as polarized electrodes in electrochemical capacitors such as electric double-layer capacitors, pseudo-capacitors, or the like. It is customary to use various activated carbons as such materials.

Heretofore, activated carbon is pretreated by being dried at a room or higher temperature under a reduced pressure or vacuum. The pretreated activated carbon is processed into a polarized electrode.

Even when activated carbon is heated at a high temperature under vacuum, some of water strongly adsorbed deeply in pores in the activated carbon cannot be removed. The remaining water in the activated carbon tends to lower the withstand voltage of a resultant electrochemical capacitor, and hence the durability thereof.

SUMMARY OF THE INVENTION

It is therefore an object of the present invention to provide a method of pretreating an activated carbon for use as a polarized electrode to remove remaining water from the activated carbon.

To achieve the above object, there is provided in accordance with the present invention a method of pretreating an activated carbon for use as a polarized electrode, comprising the steps of bringing an activated carbon for use as a polarized electrode into contact with an organic compound which forms an azeotropic mixture with water, so that the activated carbon is impregnated with the organic compound, and drying the activated carbon impregnated with the organic compound with heat to remove the azeotropic mixture of the organic compound and the water.

Specifically, before the activated carbon is processed into the polarized electrode, the activated carbon is brought into an organic compound which forms an azeotropic mixture with water. When the activated carbon contacts such an organic compound, the activated carbon is impregnated with the organic compound, which enters deeply into pores in the activated carbon.

Then, when the activated carbon impregnated with the organic compound is heated, the organic compound forms an azeotropic mixture with water adsorbed in the pores in the activated carbon, and the azeotropic mixture is boiled. Therefore, the organic compound and the water can be removed from the activated carbon when the activated carbon is dried with heat.

The activated carbon may be immersed in the organic compound to impregnate the activated carbon with the organic compound. At this time, the activated carbon should preferably be shaped as an electrode for easy handling. For easily treatment, the activated carbon should preferably be impregnated with the organic compound before it is placed in a cell of a capacitor or a battery. However, after the activated carbon is placed in a cell, the cell may be filled with an electrolytic solution that contains the above organic compound. The activated carbon should preferably be preheated in order to remove at least a portion of the water adsorbed by the activated carbon.

In order to remove the water, the organic compound should preferably be easily adsorbed by the activated carbon, and when the organic compound forms an azeotropic mixture with water, the azeotropic mixture should preferably contains a large amount of water, preferably, 28 weight % of water or more. The organic compound may comprise at least one compound selected from the group consisting of benzene, chlorobenzene, ethyl acetate, methyl ethyl ketone, 1,4-dioxane, and methyl acetate. Preferably, the organic compound should comprise benzene because it is selectively adsorbed to sites where water in the activated carbon is adsorbed and can easily form an azeotropic mixture with the water adsorbed to the sites.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
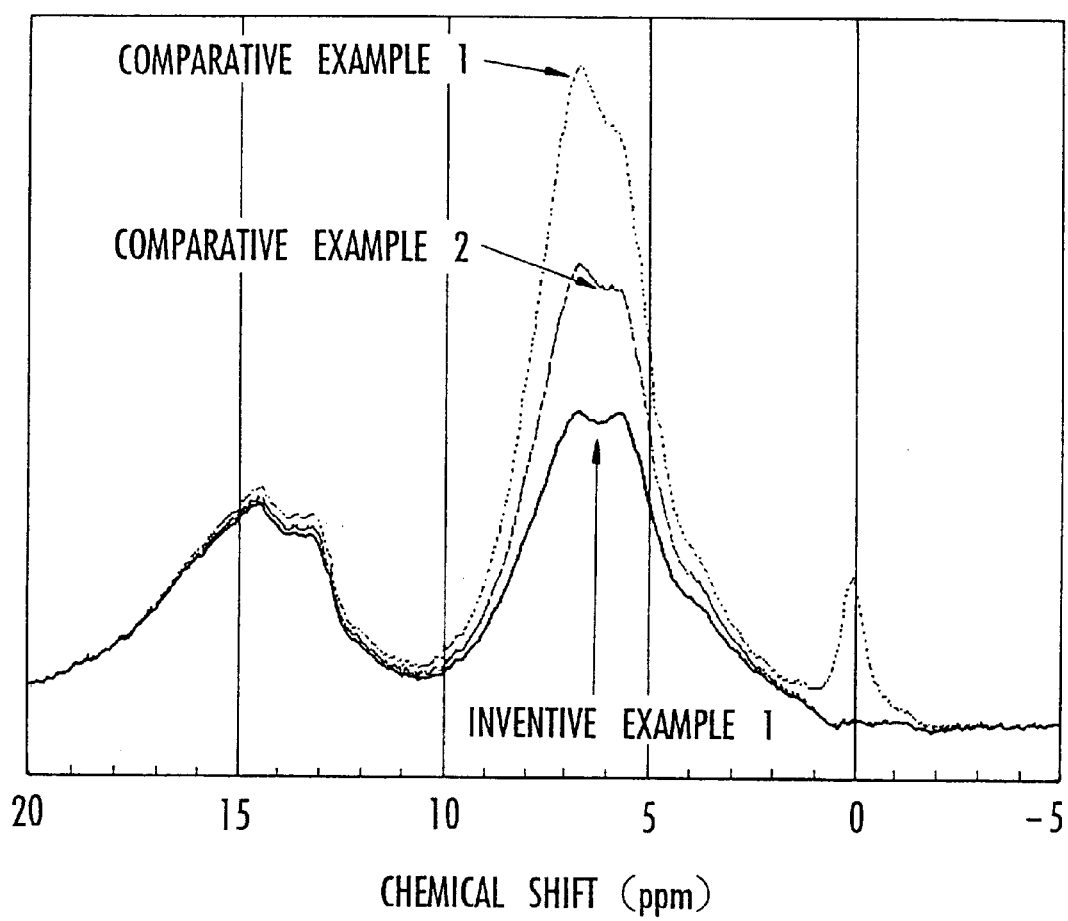
FIG. 1 is a diagram showing high-resolution solid-state $^1$H-NMR spectrums of an activated carbon according to Inventive Example 1 which was pretreated by a method according to the present invention, an activated carbon left to stand in the atmosphere, and an activated carbon dried by a conventional method.

An activated carbon that is pretreated by a method according to the present invention is used as a polarized electrode in an electrochemical capacitor such as an electric double-layer capacitor, a pseudo-capacitor, or the like. After being activated according to a normal activating process, the pretreated activated carbon will be placed in a cell. The activated carbon may be processed into an electrode shape for easily handling. If the activated carbon is to be used in an electric double-layer capacitor, then after it is activated according to a normal activating process, it is kneaded with a binder such as polytetrafluoroethylene or the like and an electrically conductive filler as of carbon black or the like. Then, the mixture is pressed to an electrode shape.

Since the activated carbon adsorbs water if left to stand in the atmosphere, it is dried with heat before being placed in a cell. For example, the activated carbon is dried by being heated at 200° C. for 72 hours under a reduced pressure of about $1 \times 10^{-2}$ Torr or vacuum.

Of the adsorbed water, a certain amount of water is strongly adsorbed by the activated carbon and another certain amount water is weakly adsorbed by the activated carbon. The weakly adsorbed water can be removed from the activated carbon when heated as described above. However, the strongly adsorbed water cannot fully be removed because only a portion of the water is removed when heated as described above.

According to the present invention, the activated carbon which has been dried by being heated is immersed in an organic compound which forms an azeotropic mixture with water, so that the activated carbon is impregnated with the organic compound. The organic compound which forms an azeotropic mixture with water may be pentane, chloroform, diisopropyl ether, carbon tetrachloride, vinyl acetate, acetonitrile, benzene, chlorobenzene, ethyl acetate, methyl ethyl ketone, 1,4-dioxane, methyl acetate, or the like. A study conducted by the invention has indicated that the organic compound is effective to remove water from the activated carbon if an azeotropic mixture formed thereby with water contains 28 weight % of water or more. Table below shows boiling points and water contents in azeotropic mixtures of the above organic compounds.

TABLE

|  | Boiling point (° C.) | Water contents in azeotropic mixtures (weight %) |
| --- | --- | --- |
| Pentane | 34.6 | 1.4 |
| Chloroform | 56.1 | 2.80 |
| Diisopropyl ether | 61.4 | 3.60 |
| Carbon tetrachloride | 66 | 4.10 |
| Vinyl acetate | 66 | 7.30 |
| Acetonitrile | 76 | 16.00 |
| Chlorobenzene | 90.2 | 28.4 |
| Benzene | 69.25 | 64.58 |
| Ethyl acetate | 70.5 | 67.17 |
| Methyl ethyl ketone | 73.6 | 69.24 |
| 1,4-dioxane | 35 | 74.11 |
| Methyl acetate | 56 | 97.48 |

As can be seen from Table shown above, those organic compounds which form azeotropic mixtures that contain 28 weight % of water or more with water are benzene, chlorobenzene, ethyl acetate, methyl ethyl ketone, 1,4-dioxane, and methyl acetate. According to the present invention, at least one selected from those six organic compounds can be used. Preferably, the organic compounds should be liable to be adsorbed by the activated carbon. Particularly, benzene is highly preferable as it can easily form an azeotropic mixture because it is selectively adsorbed to sites where water in the activated carbon is adsorbed.

When the activated carbon impregnated with the organic compound is dried by being heated, the organic compound and the strongly adsorbed water are removed, with the result that the activated carbon is more free of water. The activated carbon may be heated at a temperature equal to or higher than the boiling point of the azeotropic mixture for thereby vaporizing the azeotropic mixture. The activated carbon should preferably be heated under a reduced pressure or vacuum because the reduced pressure or vacuum is effective to lower the boiling point for accelerating the vaporization of the azeotropic mixture.

Inventive and Comparative Examples will be described below.

INVENTIVE EXAMPLE 1

To 80 parts by weight of steam-activated carbon of phenolic resin, there were added 10 parts by weight of a binder of polytetrafluoroethylene and 10 parts by weight of an electrically conductive filler as of carbon black. After the mixture was kneaded, it was pressed to a square electrode shape with each side 40 mm long for use as a polarized electrode.

The activated carbon of the electrode shape was dried under vacuum at 200° C. for 72 hours. Then, the activated carbon was immersed in dehydrated benzene for 15 minutes, so that the activated carbon was impregnated with the dehydrated benzene. The activated carbon impregnated with the dehydrated benzene was dried under vacuum at 70° C. for 4 hours, and further dried under vacuum at 100° C. for 90 minutes.

In order to determine the amount of water adsorbed by the activated carbon, an $^1$H-NMR spectrum of the activated carbon was measured by high-resolution solid-state NMR using GSX-270 ($^1$H resonant frequency of 270 MHz) manufactured by JEOL Ltd. according to a magic angle spinning single-pulse process at a magic angle spinning frequency of 6 kHz. FIG. 1 shows the obtained spectrum.

COMPARATIVE EXAMPLE 1

An activated carbon of an electrode shape for use as a polarized electrode was produced exactly in the same manner as with Inventive Example 1. The activated carbon was left to stand in the atmosphere for one week. Then, an $^1$H-NMR spectrum of the activated carbon was measured in the same manner as with Inventive Example 1. FIG. 1 shows the obtained spectrum.

COMPARATIVE EXAMPLE 2

An activated carbon of an electrode shape for use as a polarized electrode was produced exactly in the same manner as with Inventive Example 1. The activated carbon was dried under vacuum at 200° C. for 72 hours. Then, an $^1$H-NMR spectrum of the activated carbon was measured in the same manner as with Inventive Example 1. FIG. 1 shows the obtained spectrum.

Protons appearing in an $^1$H-NMR spectrum of activated carbon are roughly divided into protons in water molecules adsorbed by the activated carbon and protons of a surface functional group of carbon. The protons in water molecules are further divided into protons of weakly adsorbed (unshielded) water and protons of strongly adsorbed (shielded) water. In FIG. 1, of the peaks of the protons, a peak that appears in a lowest magnetic field is used as a chemical shift reference (0 ppm).

The types of protons to which the peaks shown in FIG. 1 belong will be described below. A review of FIG. 1 indicates that the spectrum of the activated carbon according to Comparative Example 1 contains three peaks at 0 ppm, 7 ppm, and 14 ppm corresponding the above three types of protons. The spectrum of the activated carbon according to Comparative Example 2 contains no peak at 0 ppm and two lower peaks at 7 ppm and 14 ppm. Therefore, the peak at 0 ppm is considered to belong to the protons of the weakly adsorbed water that can be fully removed when the activated carbon is dried under vacuum at 200° C. for 72 hours.

A comparison between the spectrum of the activated carbon according to Comparative Example 2 and the spectrum of the activated carbon according to Inventive Example 1 shows that they contain substantially the same peaks at 14 ppm, and the peak at 7 ppm in the spectrum of the activated carbon according to Inventive Example 1 is lower than the peak at 7 ppm in the spectrum of the activated carbon according to Comparative Example 2. Therefore, the peak at 14 ppm is considered to belong to the protons of the surface functional group of carbon, and the peak at 7 ppm is considered to belong to the protons of the strongly adsorbed water.

Since the protons to which the peak at 7 ppm belongs are strongly adsorbed by the activated carbon, they are considered to be shifted toward a high magnetic field by being shielded by π electrons of the activated carbon. The peak at 7 ppm is broad because water appears to be adsorbed to various sites in the activated carbon.

Figure 2:
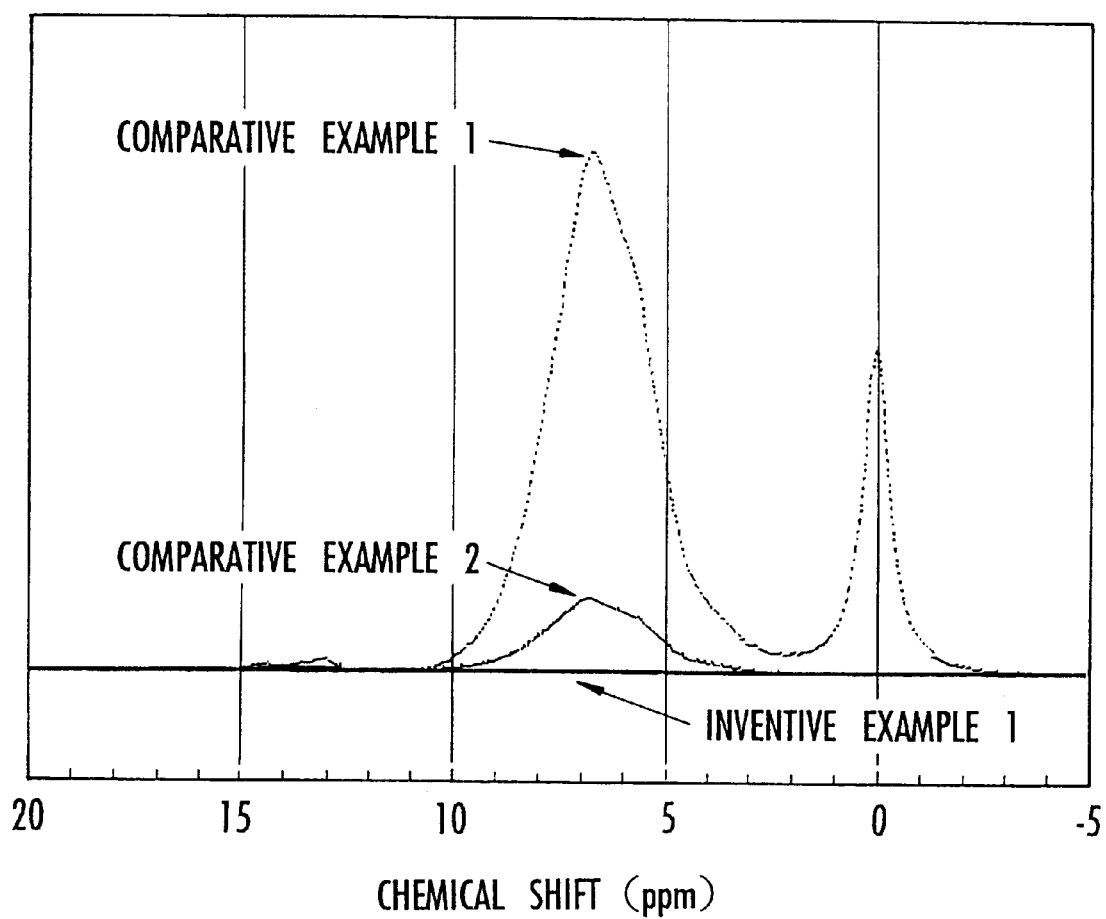
FIG. 2 is a diagram showing differential spectrums of the spectrums of the activated carbon left to stand in the atmosphere and the activated carbon dried by the conventional method with respect to the spectrum of the activated carbon according to Inventive Example 1.

FIG. 2 shows differential spectrums of the spectrums of the activated carbons according to Comparative Example 1 and Comparative Example 2 with respect to the spectrum of the activated carbon according to Inventive Example 1.

It can be seen from FIG. 2 that the weakly adsorbed water indicated by the peak at 0 ppm can completely be removed by drying the activated carbon according to Comparative Example 2 under vacuum at 200° C. for 72 hours. However, it is apparent that the strongly adsorbed water indicated by the peak at 7 ppm cannot completely be removed under the conditions of Comparative Example 2, and that the strongly adsorbed water can further be reduced by impregnating the activated carbon with an organic compound which forms an azeotropic mixture with water and drying the activated carbon with heat as with Inventive Example 1.

Therefore, the method according to the present invention is more effective to reduce water contained in activated carbon than the conventional processes. By making polarized electrodes of the activated carbon pretreated by the method according to the present invention, capacitors and secondary batteries having such polarized electrodes have increased withstand voltages and durability.

INVENTIVE EXAMPLE 2

Figure 3:
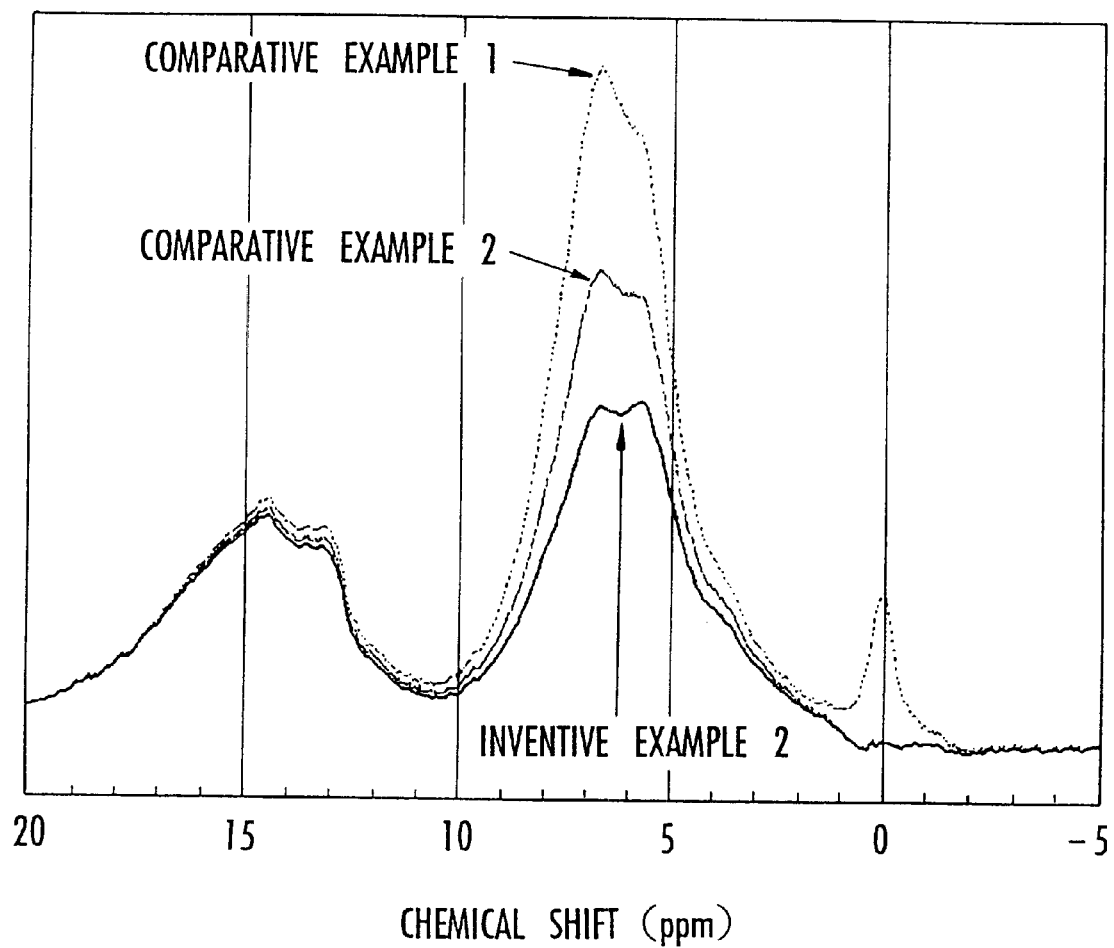
FIG. 3 is a diagram showing high-resolution solid-state $^1$H-NMR spectrums of the activated carbon according to Inventive Example 2 which was pretreated by the method according to the present invention, the activated carbon left to stand in the atmosphere, and the activated carbon dried by the conventional method.

An activated carbon of an electrode shape for use as a polarized electrode was produced exactly in the same manner as with Inventive Example 1. The activated carbon was dried under vacuum in the same manner as with Inventive Example 1 except that chlorobenzene was used instead of benzene, and an $^1$H-NMR spectrum of the activated carbon was measured in the same manner as with Inventive Example 1. FIG. 3 shows the obtained spectrum as well as the spectrums of the activated carbons according to Comparative Example 1 and Comparative Example 2. It can be understood from FIG. 3 that the $^1$H-NMR spectrum of the activated carbon according to Inventive Example 2 exhibits the same properties as with Inventive Example 1, showing a reduction of the strongly adsorbed water.

INVENTIVE EXAMPLE 3

Figure 4:
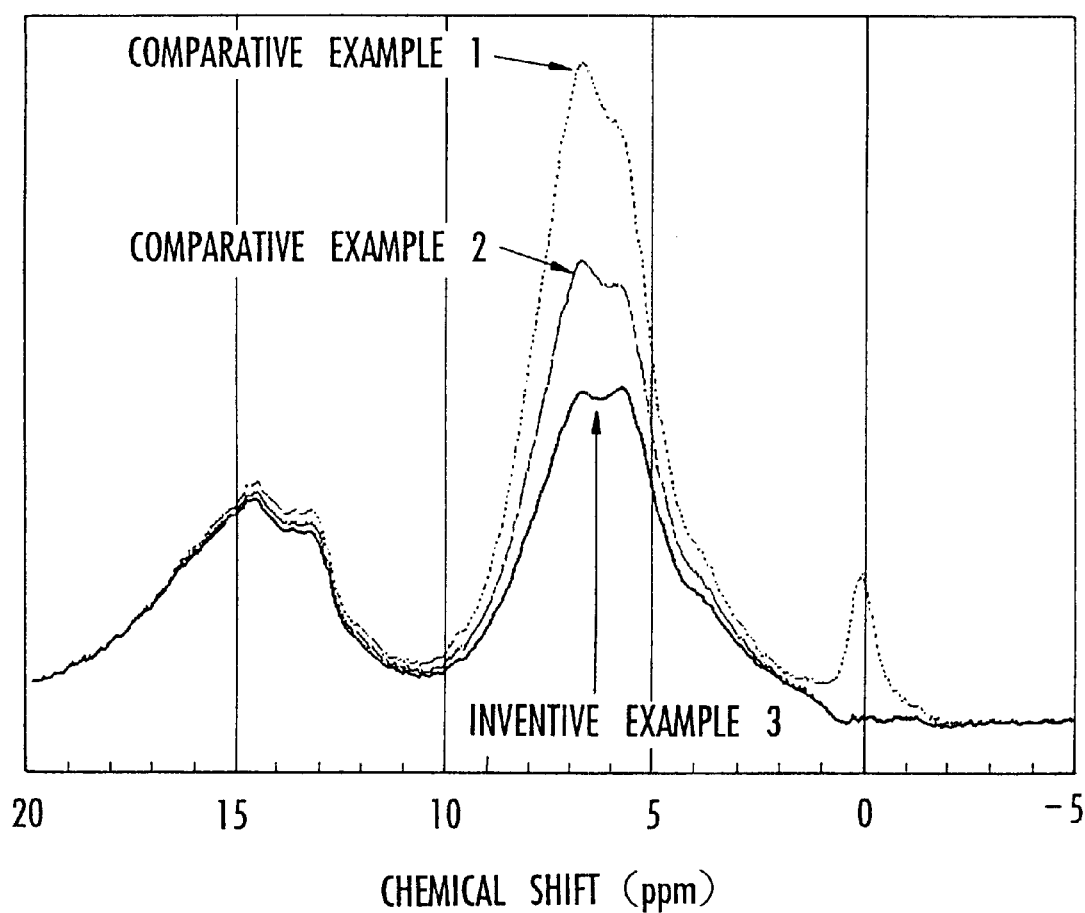
FIG. 4 is a diagram showing high-resolution solid-state $^1$H-NMR spectrums of an activated carbon according to Inventive Example 3 which was pretreated by the method according to the present invention, the activated carbon left to stand in the atmosphere, and the activated carbon dried by the conventional method.

An activated carbon of an electrode shape for use as a polarized electrode was produced exactly in the same manner as with Inventive Example 1. The activated carbon was dried under vacuum in the same manner as with Inventive Example 1 except that ethyl acetate was used instead of benzene, and an $^1$H-NMR spectrum of the activated carbon was measured in the same manner as with Inventive Example 1. FIG. 4 shows the obtained spectrum as well as the spectrums of the activated carbons according to Comparative Example 1 and Comparative Example 2. It can be understood from FIG. 4 that the $^1$H-NMR spectrum of the activated carbon according to Inventive Example 3 exhibits the same properties as with Inventive Example 1, showing a reduction of the strongly adsorbed water.

INVENTIVE EXAMPLE 4

Figure 5:
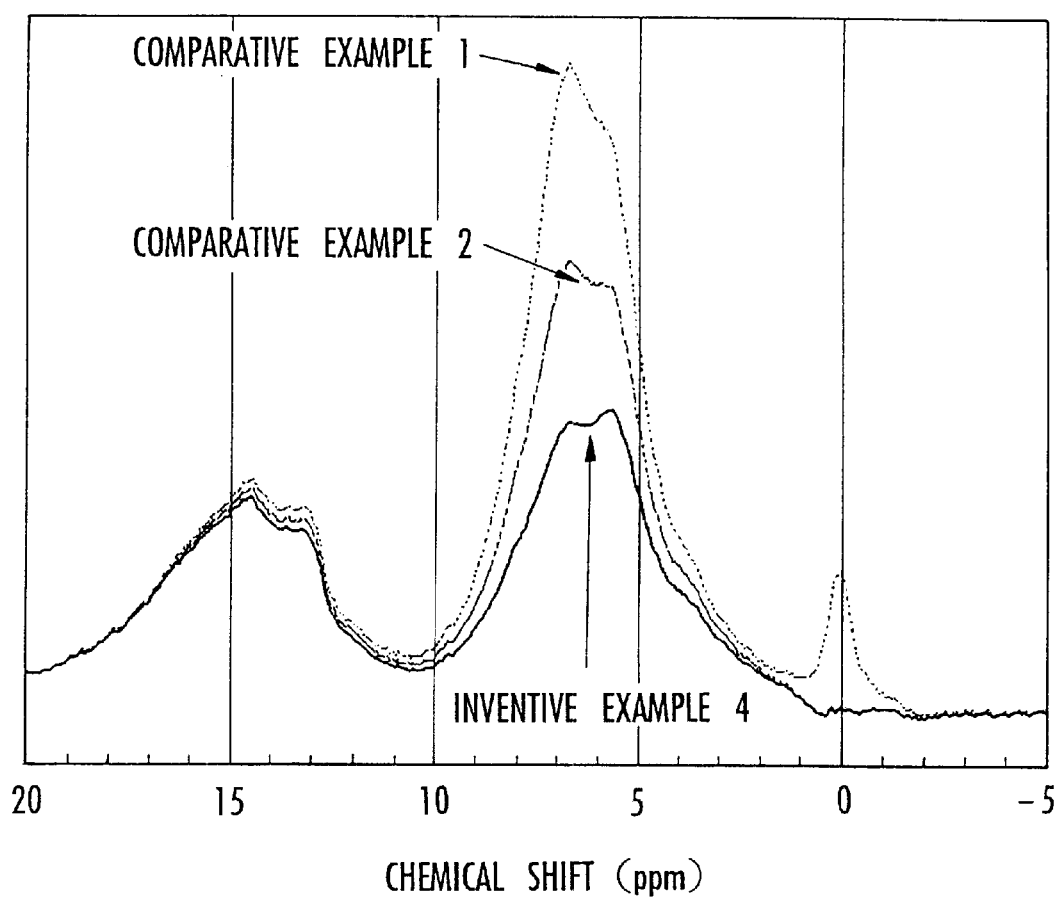
FIG. 5 is a diagram showing high-resolution solid-state $^1$H-NMR spectrums of an activated carbon according to Inventive Example 4 which was pretreated by the method according to the present invention, the activated carbon left to stand in the atmosphere, and the activated carbon dried by the conventional method.

An activated carbon of an electrode shape for use as a polarized electrode was produced exactly in the same manner as with Inventive Example 1. The activated carbon was dried under vacuum in the same manner as with Inventive Example 1 except that methyl ethyl ketone was used instead of benzene, and an $^1$H-NMR spectrum of the activated carbon was measured in the same manner as with Inventive Example 1. FIG. 5 shows the obtained spectrum as well as the spectrums of the activated carbons according to Comparative Example 1 and Comparative Example 2. It can be understood from FIG. 5 that the $^1$H-NMR spectrum of the activated carbon according to Inventive Example 4 exhibits the same properties as with Inventive Example 1, showing a reduction of the strongly adsorbed water.

INVENTIVE EXAMPLE 5

Figure 6:
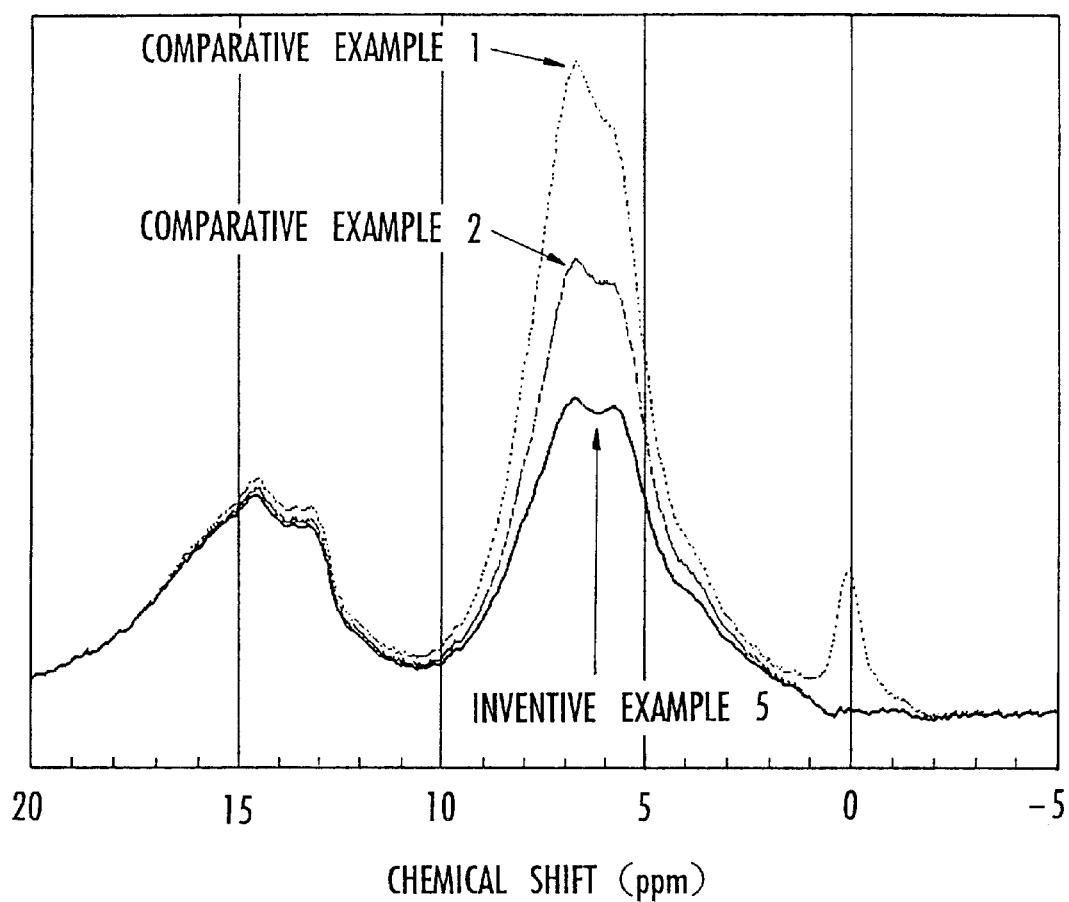
FIG. 6 is a diagram showing high-resolution solid-state $^1$H-NMR spectrums of an activated carbon according to Inventive Example 5 which was pretreated by the method according to the present invention, the activated carbon left to stand in the atmosphere, and the activated carbon dried by the conventional method.

An activated carbon of an electrode shape for use as a polarized electrode was produced exactly in the same manner as with Inventive Example 1. The activated carbon was dried under vacuum in the same manner as with Inventive Example 1 except that 1,4-dioxane was used instead of benzene, and an $^1$H-NMR spectrum of the activated carbon was measured in the same manner as with Inventive Example 1. FIG. 6 shows the obtained spectrum as well as the spectrums of the activated carbons according to Comparative Example 1 and Comparative Example 2. It can be understood from FIG. 6 that the $^1$H-NMR spectrum of the activated carbon according to Inventive Example 5 exhibits the same properties as with Inventive Example 1, showing a reduction of the strongly adsorbed water.

INVENTIVE EXAMPLE 6

Figure 7:
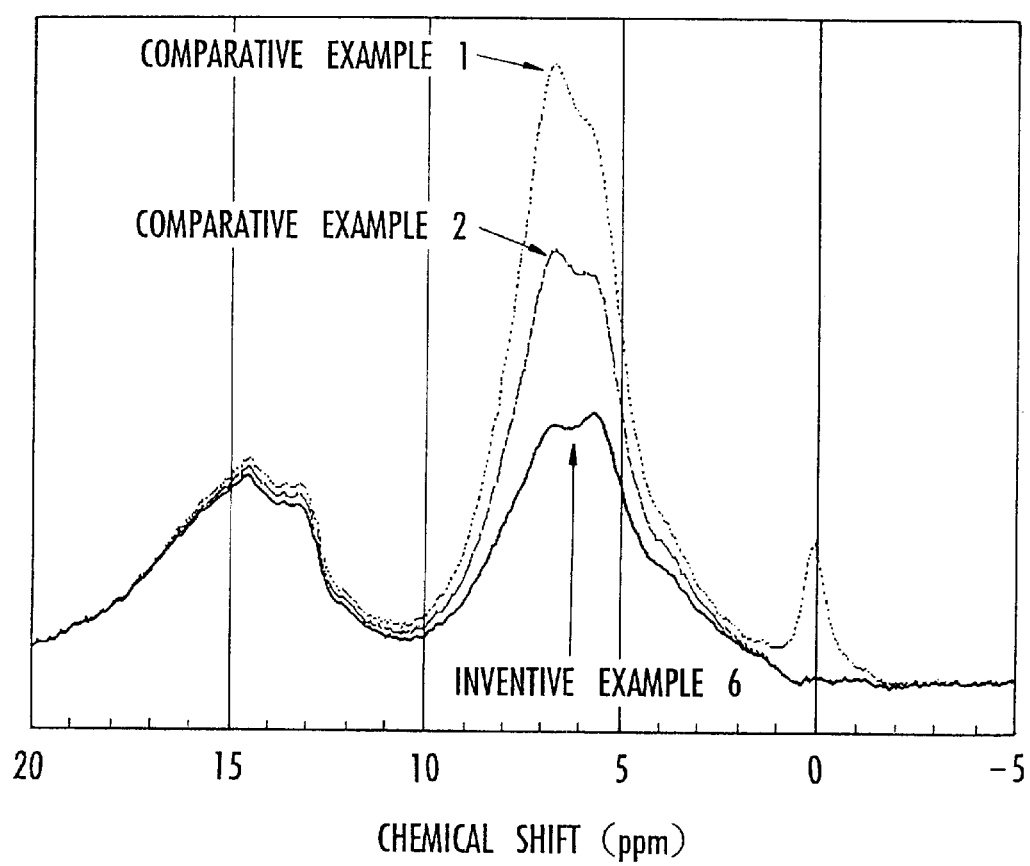
FIG. 7 is a diagram showing high-resolution solid-state $^1$H-NMR spectrums of an activated carbon according to Inventive Example 6 which was pretreated by the method according to the present invention, the activated carbon left to stand in the atmosphere, and the activated carbon dried by the conventional method.

An activated carbon of an electrode shape for use as a polarized electrode was produced exactly in the same manner as with Inventive Example 1. The activated carbon was dried under vacuum in the same manner as with Inventive Example 1 except that methyl acetate was used instead of benzene, and an $^1$H-NMR spectrum of the activated carbon was measured in the same manner as with Inventive Example 1. FIG. 7 shows the obtained spectrum as well as the spectrums of the activated carbons according to Comparative Example 1 and Comparative Example 2. It can be understood from FIG. 7 that the $^1$H-NMR spectrum of the activated carbon according to Inventive Example 6 exhibits the same properties as with Inventive Example 1, showing a reduction of the strongly adsorbed water.

Although certain preferred embodiments of the present invention have been shown and described in detail, it should be understood that various changes and modifications may be made therein without departing from the scope of the appended claims.

What is claimed is:

1. A method of pretreating an activated carbon for use as a polarized electrode, comprising the steps of:

bringing an activated water-containing carbon for use as a polarized electrode into contact with an organic compound consisting of an organic compound which forms an azeotropic mixture with water, so that the activated carbon is impregnated with the organic compound, wherein the organic compound is selected from the group consisting of pentane, chloroform, diisopropyl ether, carbon tetrachloride, vinyl acetate, acetonitrile, chlorobenzene, benzene, ethyl acetate, methyl ethyl ketone, 1,4-dioxane, and methyl acetate; and drying the activated carbon impregnated with the organic compound with heat to remove the azeotropic mixture of the organic compound and the water contained in the activated water-containing carbon.

2. A method according to claim 1, wherein said step of bringing the activated carbon into contact with the organic compound comprises the step of:

immersing the activated carbon in the organic compound to impregnate the activated carbon with the organic compound.

3. A method according to claim 1, further comprising the step of:

processing said activated carbon into an electrode shape, wherein said activated carbon is impregnated with the organic compound after said processing step.

4. A method according to claim 1, further comprising the step of:

processing said activated carbon into an electrode shape, wherein said activated carbon is impregnated with the organic compound after said processing step and before the activated carbon is placed in a cell.

5. A method according to claim 1, further comprising the step of:

drying said activated carbon with heat before said activated carbon is impregnated with the organic compound.

6. A method according to claim 1, wherein when said organic compound forms an azeotropic mixture with water, said azeotropic mixture contains 28 weight % of water or more.

* * * * *